US008792317B2

(12) United States Patent  
Wilson

(10) Patent No.: US 8,792,317 B2
(45) Date of Patent: Jul. 29, 2014

(54) OPTICAL STORAGE DEVICE WITH DIRECT READ AFTER WRITE

(75) Inventor: Scott D Wilson, Thorton, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 13/416,633

(22) Filed: Mar. 9, 2012

(65) Prior Publication Data

US 2013/0235708 A1  Sep. 12, 2013

(51) Int. Cl.
  *G11B 7/135* (2012.01)
  *G11B 7/00* (2006.01)

(52) U.S. Cl.
  USPC ............ 369/112.08; 369/112.13; 369/112.23; 369/112.24; 369/112.16; 369/110.01; 369/110.02

(58) Field of Classification Search
  USPC ............ 369/112.08, 112.13, 112.23, 112.24, 369/112.16, 110.01, 110.02
  See application file for complete search history.

(56) References Cited

U.S. PATENT DOCUMENTS

| | | | |
|---|---|---|---|
| 4,694,447 A | 9/1987 | Cohen | |
| 5,444,233 A * | 8/1995 | Sasaki | 369/53.18 |
| 6,034,933 A | 3/2000 | Rokutan | |
| 6,141,312 A | 10/2000 | Masters et al. | |
| 6,314,071 B1 * | 11/2001 | Alon et al. | 369/53.37 |
| 6,442,126 B1 | 8/2002 | Marchant et al. | |
| 2002/0064121 A1 * | 5/2002 | Takahashi | 369/112.22 |
| 2002/0181382 A1 * | 12/2002 | Oakley | 369/97 |
| 2005/0226124 A1 * | 10/2005 | Kimura et al. | 369/112.08 |
| 2006/0133226 A1 * | 6/2006 | Lin | 369/43 |
| 2008/0225656 A1 | 9/2008 | Stallinga et al. | |
| 2009/0135705 A1 * | 5/2009 | Kaneda et al. | 369/112.03 |
| 2011/0141868 A1 | 6/2011 | Mahnad | |

OTHER PUBLICATIONS

International Search Report mailed May 5, 2013 for PCT/US2013/025498 filed Feb. 11, 2013.
Written Opinion mailed May 2, 2013 for PCT/US2013/025498 filed Feb. 11, 2013.
Optical head Design for 1TB Optical Tape Drive, Mahdad Manavi et al., LOTS Technology, Inc.
MicroContinuum: Technology: Data Storage, "Optical Tape—A new Way to Archive Data", Copyright 2008.

* cited by examiner

*Primary Examiner* — Aneeta Yodichkas
(74) *Attorney, Agent, or Firm* — Brooks Kushman P.C.

(57) ABSTRACT

A system and method for providing direct read after write functionality in an optical data storage device include an optical head having a first coherent light source modulated at higher power during writing of data to the optical medium and a second coherent light source operating in a continuous wave mode at lower power while the first coherent light source is writing data. Optic components combine light from the first and second light sources and focus light from the first coherent light source to a first spot of a selected track on the optical medium and focus light from the second coherent light source to a second spot on the selected track downstream from the first spot relative to movement direction of the optical medium to read and verify the data directly after writing during the write process rather than in a separate verification process.

12 Claims, 3 Drawing Sheets

OPTICAL STORAGE DEVICE WITH DIRECT READ AFTER WRITE

TECHNICAL FIELD

The present disclosure relates to an optical data storage device that reads data directly after writing the data to a storage medium.

BACKGROUND

Optical recording devices, such as optical disk and optical tape drives, commonly use an Optical Pickup Unit (OPU) or read/write head to store and retrieve data from associated optical media. Conventional OPUs may utilize different wavelength semiconductor laser diodes with complex beam path optics and electromechanical elements to focus and track the optical beam within one or more preformatted tracks on the optical storage medium to write or store the data and subsequently read the data. Data written to the medium with a laser at higher power may be verified in a separate verification operation or process after writing using a lower laser power, or may be verified during the write operation by another laser or laser beam. The ability to read and verify the data during the write operation may be referred to as Direct Read After Write (DRAW). One strategy for providing DRAW functionality is to use multiple independent OPUs with one OPU writing the data as a second OPU reads the data for write verification, such as disclosed in U.S. Pat. No. 6,141,312, for example, where two separate OPUs are placed side-by-side to achieve DRAW functionality. While this approach may be suitable for some applications, it increases the cost and complexity of the storage device.

Present OPUs may use a diffraction grating or similar optics in the laser path to generate two or more beams from a single laser element including a higher power beam used for reading/writing data and for focusing, and one or more lower power satellite beams used for tracking. The beams are focused to corresponding spots on the surface of the optical storage medium by the various optical and electromechanical elements of the OPU(s). In addition to writing data and focus control, the center spot may also be used for tracking operations in some applications. The lower power satellite spot(s) generated from one or more lower-power side-beams may be used for another type of tracking operation for specific types of media.

SUMMARY

In one embodiment of the present disclosure, an optical storage system that receives an optical medium having a plurality of tracks for storing data includes an optical head having a first coherent light source modulated at higher power during writing of data to the optical medium and a second coherent light source operating in a continuous wave mode at lower power while the first coherent light source is writing data, optics that combine light from the first and second light sources and focus light from the first coherent light source to a first spot of a selected track on the optical medium and focus light from the second coherent light source to a second spot on the selected track downstream from the first spot relative to movement direction of the optical medium, the optics directing reflected light from the optical medium to a photodetector. A controller coupled to the optical head selectively positions the optical head for writing data along the selected track using the first coherent light source while reading data directly after writing from the selected track using reflected light from the second coherent light source detected by the photodetector.

In one embodiment, an optical data storage system includes an optical pickup unit, a first laser disposed within the optical pickup unit, a second laser disposed within the optical pickup unit, and an amplitude beam splitter disposed within the optical pickup unit and positioned to combine light from the first and second lasers and direct combined light toward an optical storage medium. A collimating lens positioned downstream of the amplitude beam splitter collimates the combined light. The system also includes a polarizing beam splitter positioned downstream of the collimating lens, a quarter-wave plate positioned downstream of the polarizing beam splitter, an objective lens positioned downstream of the quarter wave plate and configured to focus light from the first laser to a first spot on a selected track of the optical storage medium, and to focus light from the second laser to a second spot on the selected track downstream of the first spot, a photodetector and associated optics configured to receive light reflected from the optical medium through the objective lens and polarizing beam splitter, and a controller in communication with the first and second lasers and the photodetector to modulate light from the first laser to write data to the selected track of the optical storage medium and read data from the selected track of the optical storage medium using the second laser to provide a direct read after write capability.

Embodiments of the present disclosure include a method for providing direct read after write functionality for an optical storage device that reads and writes data to an optical storage medium includes combining light from a first laser modulated at higher power during writing of data to the optical storage medium and light from a second laser operated in a continuous wave mode at lower power, focusing light from the first laser to a first spot within a selected track on the optical storage medium, focusing light from the second laser to a second spot within the selected track on the optical storage medium downstream relative to the first spot in the direction of travel of the optical storage medium, and directing light reflected from the second spot to a photodetector to provide direct read after write functionality.

Embodiments according to the present disclosure may provide various advantages. For example, an optical storage device according to one embodiment of the present disclosure provides direct read after right functionality for data verification using a single OPU or optical head, which reduces complexity and associated costs.

The above advantages and other advantages and features associated with various embodiments of the present disclosure will be readily apparent from the following detailed description when taken in connection with the accompanying drawings.

DETAILED DESCRIPTION

Various embodiments of the present disclosure are described herein. However, the disclosed embodiments are merely exemplary and other embodiments may take various and alternative forms that are not explicitly illustrated or described. The Figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the Figures may be combined with features illustrated in one or more other Figures to produce embodiments that are not explicitly illustrated or described. The combinations of features illustrated provide representative embodiments for representative applications. However, various combinations and modifications of the features consistent with the teachings of this disclosure may be desired for particular applications or implementations.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as optical and magnetic disks and tapes, solid state devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 1A:
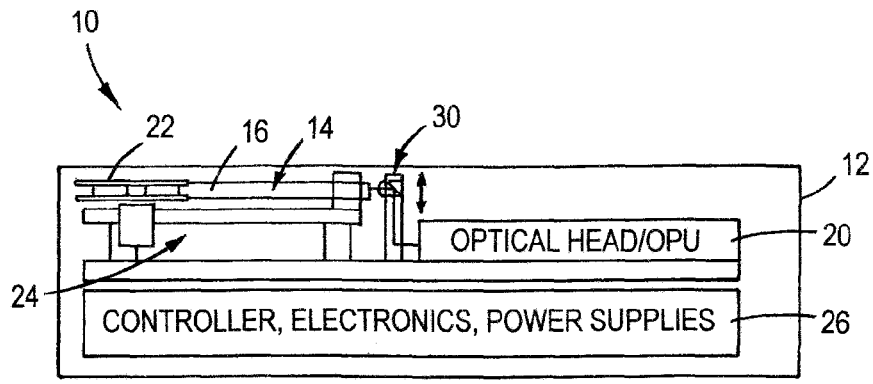
FIGS. 1A and 1B are diagrams illustrating operation of an optical data storage system or method with direct read after write (DRAW) functionality according to various embodiments of the present disclosure.
Figure 1B:
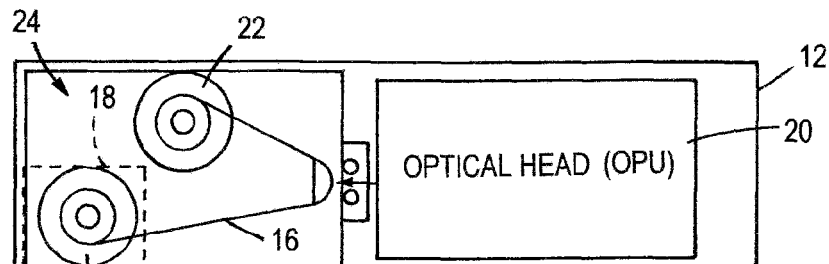

Referring now to FIGS. 1A and 1B, block diagrams illustrating operation of an optical data storage system or method with direct read after write (DRAW) capability according to various embodiments of the present disclosure are shown. FIG. 1A is a side view diagram and FIG. 1B is a top or plan view diagram. In the representative embodiment illustrated in FIGS. 1A and 1B, optical data storage system 10 is implemented by an optical tape drive 12 that receives an optical data storage medium 14 implemented by an optical tape 16. While illustrated and described with reference to an optical tape drive, those of ordinary skill in the art will recognize that the teachings of the present disclosure may also be applied to various other types of optical data storage devices that may use various types of write-once or re-writable optical media, such as optical discs, for example. In one embodiment, optical tape 16 is a ½ inch (12.7 mm) wide tape having a plurality of tracks generally extending across the width of the tape and may vary in length depending on the desired storage capacity and performance characteristics as illustrated and described in greater detail herein. Optical tape 16 may be wound on an associated spool 30 contained within a protective case or cartridge 18 that is manually or automatically loaded or mounted in optical tape drive 12. Transport mechanism 24 moves optical tape 16 through a carriage and past at least one optical pickup unit (OPU) or optical head 20 to a take-up spool 22 that typically remains within tape drive 12. OPU 20 writes data to, and reads data from, optical tape 16 as transport mechanism 24 moves optical tape 16 between cartridge 18 and take-up spool 22 in response to at least one controller and associated electronics 26. As explained in greater detail below, data may be read/written to optical tape 16 in one or more of the plurality of tracks in a serpentine fashion as the tape travels in either direction past OPU 20, i.e. either from cartridge 18 to take-up spool 22, or from take-up spool 22 to cartridge 18.

Optical head 20 may include associated optics and related electromechanical servo controlled devices, represented generally by reference numeral 30, that direct a higher power modulated write beam and a lower power continuous wave (cw) read beam to an objective lens that focuses the beams to corresponding spots on the storage medium for writing/reading data as illustrated and described in greater detail with reference to FIG. 2. Various servo mechanisms (not specifically illustrated) may be used to position/align the beams with a selected one of the plurality of tracks 36 on optical tape 16.

Figure 2:
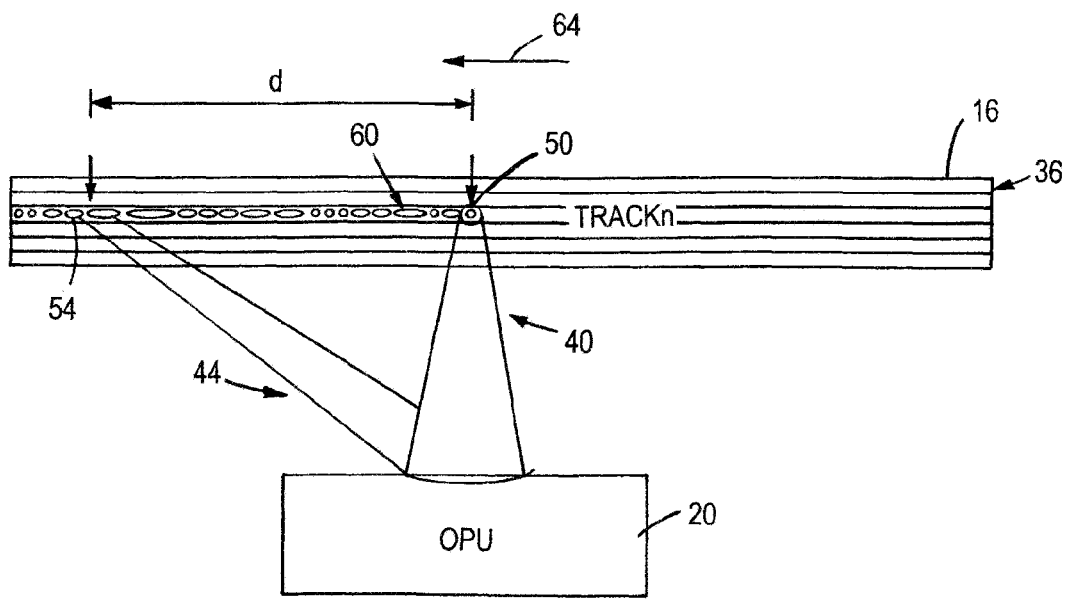
FIG. 2 is a block diagram illustrating operation of an optical pickup unit (OPU) having a writing laser source and integrated DRAW laser source forming a main beam and side beam to provide DRAW functionality according to various embodiments of the present disclosure.

FIG. 2 is a block diagram illustrating operation of a system or method for direct read after write according to the present disclosure. In the representative embodiment of FIG. 2, an optical pickup unit (OPU) 20 having a first coherent light beam 40 and a second coherent light beam 44 provide DRAW functionality using only a single head or OPU. Beams 40 and 44 may be generated by corresponding coherent light sources such as laser diodes (best illustrated in FIG. 3), for example. Alternatively, a single or common coherent light source may be used with associated optics to split the beam. However, as described in greater detail herein, use of a single or common light source to generate both the read and the write beams may require more sophisticated processing of the reflected beam used to read the data and filter the effects of the modulation associated with writing the data to the storage medium.

In various embodiments according to the present disclosure, OPU 20 includes a first laser 320 (FIG. 3) to generate first coherent light beam 40 and a second laser 322 (FIG. 3) to generate second coherent light beam 44. Associated optics (best illustrated in FIG. 3) combine the first and second beams and focus the beams to associated spots 50 and 54, respectively, within a selected track "n" of a plurality of tracks 36 on the optical tape 16. Optical spots 50, 54 may be manipulated by various optical and electromechanical elements of OPU 20 to write and retrieve data from optical tape 16.

Figure 3:
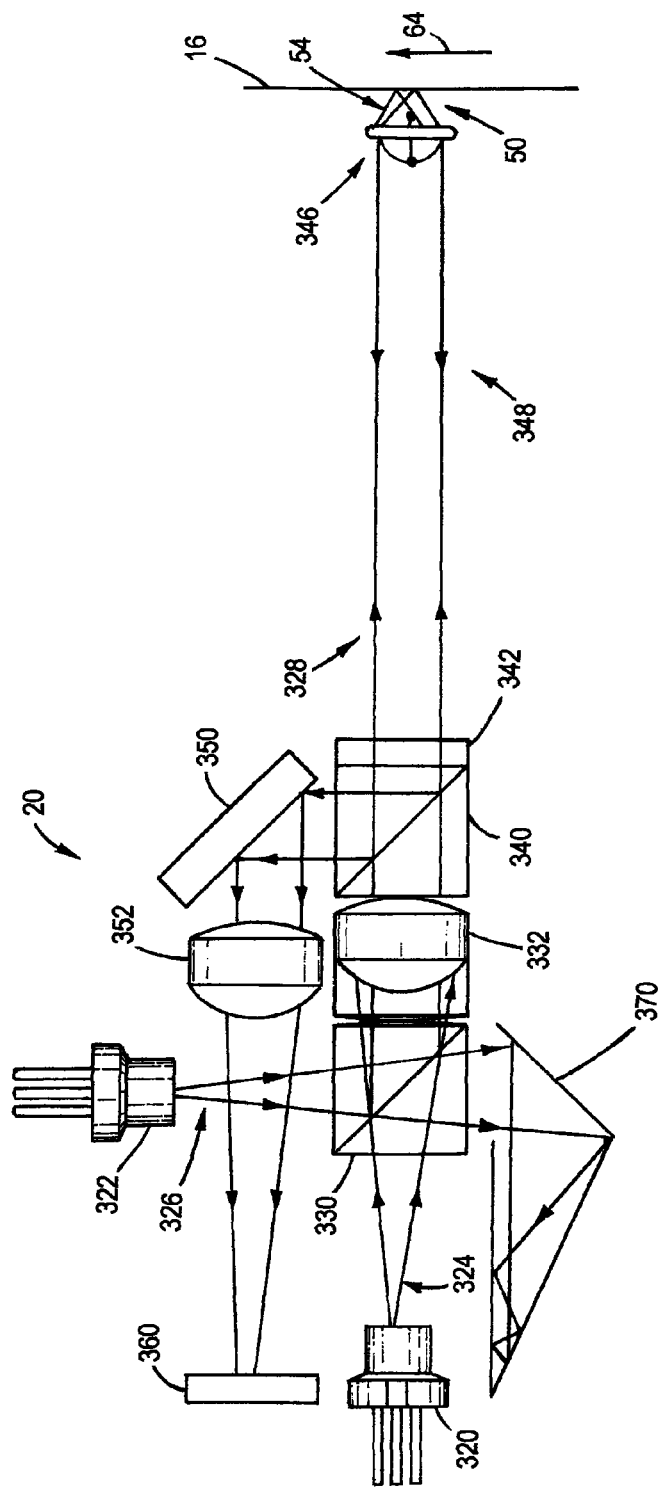
FIG. 3 is a block diagram illustrating a representative OPU having integrated write and DRAW laser sources according to various embodiments of the present disclosure.

Referring now to FIGS. 2 and 3, the first and second light sources or lasers 320, 322 may operate at different power levels and in different modes to provide DRAW functionality. For example, the first light source 320 that generates beam 40 and spot 50 may be operated at higher power and modulated to write corresponding data impressions 60 on optical tape 16, while the second light source 322 may be operated at lower power in a continuous wave (cw) mode to provide beam 44 and spot 54 to read the data impressions 60 directly after writing by beam 40. The second (DRAW) spot 54 is positioned a sufficient distance downstream in the direction of travel 64 of tape 16 relative to write spot 50 to allow the data impressions 60 sufficient time to stabilize before being read. In one embodiment, center spot 50 may have an average power of 10-20 times more than the average power of DRAW spot 54. For example, center spot 50 may have an average power of about 8 mW to write data, while DRAW spot 54 may only have an average power of about 0.35 mW to read data directly after writing. The lower power of DRAW spot 54 assures that it will contain sufficiently low energy to not alter the previously written data on optical storage medium or tape 16.

In one representative embodiment, spots 50 and 54 are mechanically aligned in the OPU manufacturing process to correspond to the axes of data tracks 36 on preformatted optical tape media 16. In addition, spots 50 and 54 are generally positioned so that transit distance (d) of tape 16 between center spot 50 and satellite/side spot 54 provides sufficient time for the data written to optical tape media 16 to stabilize based on the fastest anticipated linear tape speed and the characteristics of the optical tape media 16. In one embodiment, OPU 20 is manufactured to provide a distance (d) of between about 10-20 µm.

Some conventional optical storage devices use center spot 50 from the higher power emitting beam 40 for reading, writing, and focusing in addition to one type of tracking operation. Satellite spots may be used for another type of tracking for specific types of media. In these applications, the satellite spots may not be aligned with one another, or with center spot 50 along a single selected track 36 of optical tape 16. In contrast to the conventional function of typical satellite beams, various embodiments according to the present disclosure use satellite spot 54 to provide direct read after write (DRAW) functionality.

As previously described, first laser beam 40 is operated at a higher power and modulated to alter the structure of the optically active layer of optical tape 16 and write data marks 60 on a selected one of the plurality of tracks 36. Satellite DRAW beam 44 has much lower power when it reaches optical tape 16 so that it does not alter the optically active layer of optical tape 16. However, satellite DRAW beam 44 is designed to have enough power after being reflected from optical tape 16 to detect data marks 60 to provide DRAW functionality.

FIG. 3 is a block diagram illustrating operation of a DRAW system or method for optical data storage according to various embodiments of the present disclosure. In the representative embodiment illustrated, the optical components including first coherent light source 320 and second coherent light source 322 are contained within a single optical head or OPU. Coherent light sources 320, 322 may be implemented by diode lasers, for example. Depending on the particular implementation, an optical storage device, such as device 10 (FIG. 1), may have multiple optical heads to write/read data simultaneously to corresponding tracks 36 of optical tape 16. In addition to coherent light sources 320, 322, OPU 20 may include an amplitude beam splitter 330 that operates to combine diverging beams 324 and 326 into a combined beam 328 that passes through a collimating lens 332 positioned downstream of the amplitude beam splitter 330. Lens 332 collimates the combined light 328, which then passes through polarizing beam splitter 340, which is positioned downstream relative to collimating lens 332. A wave retarder, such as quarter wave plate 342 is positioned downstream of polarizing beam splitter 340 to change polarization of light 328 directed to the optical storage medium 16 relative to reflected light 348 from the optical storage medium 16 to facilitate redirection of reflected light 348 by polarizing beam splitter 340 to mirror 350. Reflected light 348 from spot 44 is then directed by mirror 350 through DRAW focusing lens 352 to photodetector 360, implemented by a photodiode array in one embodiment.

Combined light 328 passing through quarter wave plate 342 is focused by objective lens 346 to form spots 50, 54 within a selected track on optical tape 16. Various strategies may be used to provide an overlapping or common beam path while focusing the light from laser source 320 to first spot 50 and light from laser source 322 to second spot 54 using a single objective lens 346. For example, different wavelengths of light may be generated by laser sources 320, 322, or the beam paths may not directly overlap and have slightly different angles of incidence relative to one another.

As illustrated in the representative embodiment of FIG. 3, photodetector 360 includes associated optics, such as DRAW lens 352, mirror 350, and quarter wave plate 342, configured to receive light reflected from the optical storage medium 16 through the objective lens 346 and polarizing beam splitter 340. A controller 26 (FIG. 1) in communication with first laser 320, second laser 322, and photodetector 360 includes control logic to modulate light 324 from first laser 320 to write data to a selected track 36 of optical storage medium 16 and operate second laser 322 in a continuous wave (cw) mode to read data from the selected track 36 of optical storage medium 16 to provide direct read after write functionality. Controller 26 may use various strategies to compare the data read using beam 326 with the data written using beam 324 to provide data verification and storage device diagnostics.

In various embodiments, amplitude beam splitter 330 is configured to transmit more than about 90% of incident light 324 from first laser 320 through to collimating lens 332 with the remaining light (not considering losses) reflected toward an optical absorber or beam dump 370. As such, amplitude beam splitter 330 will therefore also transmit about 90% of incident light 326 from second laser 322 to beam dump 370 and redirect less than about 10% of the incident light 326 from second laser 322 to collimating lens 332. In one embodiment, amplitude beam splitter 330 transmits about 95% of light 324 with the remaining 5% of light redirected to optical absorber 370. Similarly, about 95% of light 326 is transmitted to beam dump 370 with the remaining 5% of light redirected to collimating lens 332. As illustrated in FIG. 3, optional beam dump 370 is positioned or configured to absorb a relatively small portion of light from first laser 320 redirected by amplitude beam splitter 330 and a relatively large portion of light from second laser 322 transmitted through amplitude beam splitter 330. In this embodiment, to provide an average write power of 8 mW (ignoring optical losses associated with all other components) to the optical tape 16, write laser 320 would operate at approximately 8.4 mW transmitting 95% through amplitude beam splitter 330. Similarly, DRAW laser 322 would operate at a relatively lower power of 7 mW to provide 0.35 mW of average read power at optical tape 16 with only 5% redirected by amplitude beam splitter 330 toward optical tape 16.

Figure 4:
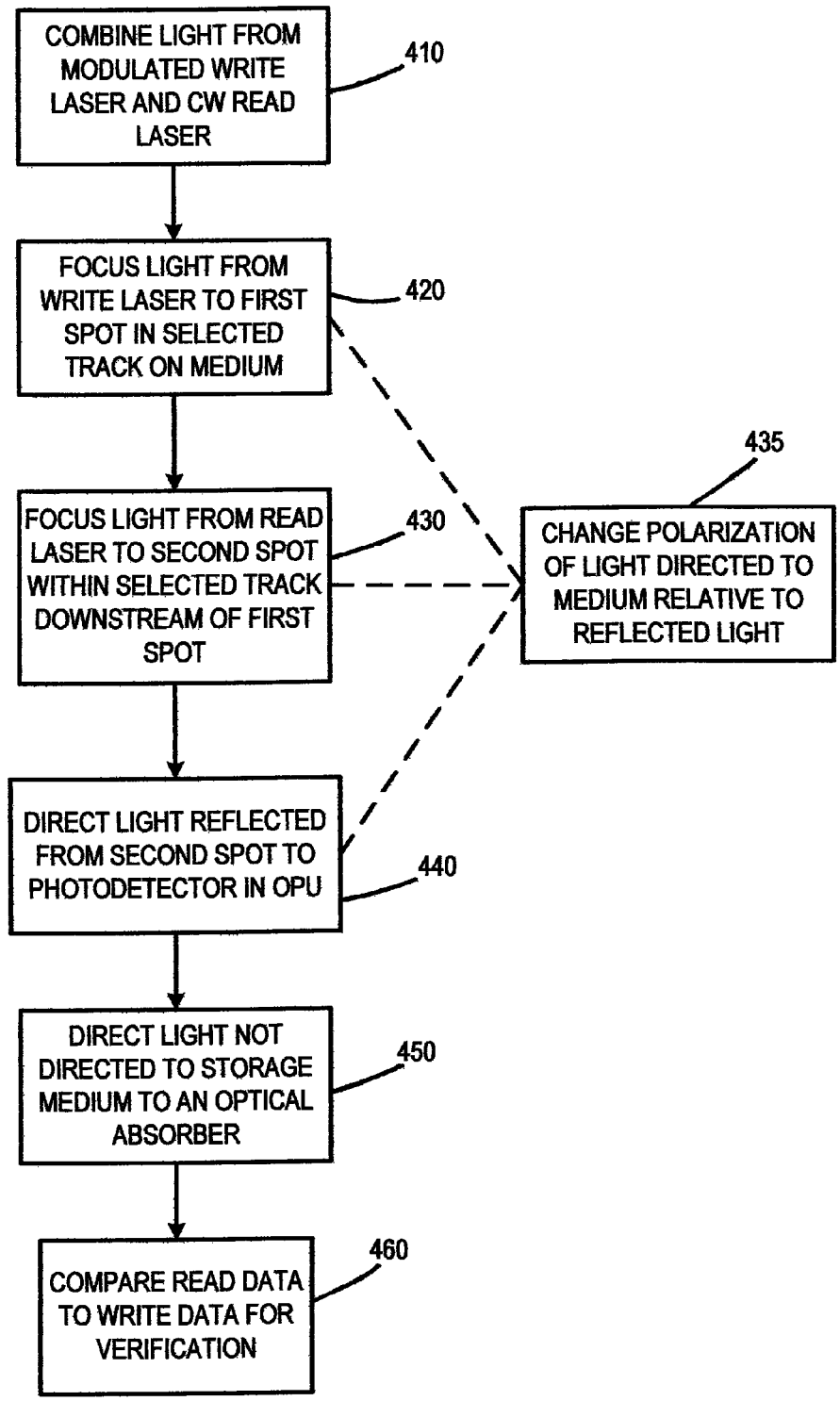
FIG. 4 is a block diagram illustrating operation of a system or method for optical data storage with DRAW functionality according to various embodiments of the present disclosure.

FIG. 4 is a block diagram illustrating operation of a system or method for optical data storage with DRAW functionality according to various embodiments of the present disclosure. Those of ordinary skill in the art will recognize that the functions represented in FIG. 4 may be performed by various optical components with an associated programmed microprocessor that compares data written to the optical storage medium with the data read directly after writing to provide direct read after write functionality. Whether performed by one or more optical components alone or in combination with a programmed microprocessor-based controller, various steps or functions illustrated may be performed in the sequence illustrated, in parallel, or in some cases omitted. Although not explicitly illustrated, one of ordinary skill in the art will recognize that one or more of the illustrated steps or functions may be repeatedly performed depending upon the particular implementation. Similarly, the order illustrated in the representative embodiment is not necessarily required to achieve the features and advantages described herein, but is provided for ease of illustration and description.

Various control functions, such as spot focusing and alignment with a selected track, for example, may be performed by a controller or processor using logic or code represented by one or more functions of the simplified flow chart of FIG. 4 to control associated components or devices within the optical storage device. Control logic may be implemented in software with instructions executed by a microprocessor-based controller. Of course, the control logic may be implemented in software, hardware, or a combination of software and hardware in one or more controllers or equivalent electronics depending upon the particular implementation. When implemented in software, the control logic may be stored in one or more computer-readable storage media having stored data representing code or instructions executed by a computer to control one or more components of the optical storage device. The computer-readable storage media may include one or more of a number of known physical devices which utilize electric, magnetic, optical, and/or hybrid storage to keep executable instructions and associated data.

Operation of a representative system or method for optical storage with DRAW functionality may include combining light from a first laser modulated at higher power during writing of data to the optical storage medium and light from a second laser operated in a continuous wave mode at lower power as represented by block 410. Associated optics may be used to focus light from the first laser to a first spot within a selected track on the optical storage medium as represented by block 420. Similarly, one or more optical devices may be used to focus light from the second laser to a second spot within the selected track on the optical storage medium downstream relative to the first spot in the direction of travel of the optical storage medium as represented by block 420. As previously illustrated and described, the first and second lasers may use one or more of the same/common optical components/devices to direct the beams toward the optical storage medium and focus the beams to corresponding spots within a selected track.

As also illustrated in FIG. 4, a system or method according to the present disclosure may include directing light reflected from the second spot to a photodetector within the OPU to provide direct read after write functionality as generally represented by block 440. Depending on the particular implementation, a system or method according to the present disclosure may also include changing polarization of light directed to the optical storage medium relative to light reflected from the optical storage medium to facilitate redirection of the light reflected from the optical storage medium to the photodetector as represented by block 435. As described above with reference to FIG. 3, this may be accomplished using a quarter-wave plate or similar wave retarder, for example, in combination with a polarizing beam splitter.

Various embodiments may optionally include one or more devices that are positioned or configured to direct light from the first and second lasers that is not directed to the optical storage medium to an optical absorber or beam dump as represented by block 450.

Light reflected from the second spot back to the photodetector as represented by block 440 may be used to compare read data with write data to provide write data verification as represented by block 460. As those of ordinary skill in the art will recognize, the read data will be time shifted by the optical medium transit delay relative to the write data. Compensation may also be provided for beam path differences and/or processing delays depending on the particular implementation.

As such, various embodiments according to the present disclosure provide a system and method for direct read after write (DRAW) functionality for an optical data storage device using a single OPU or optical head, which reduces complexity and associated costs.

While exemplary embodiments are described above, it is not intended that these embodiments describe all possible forms encompassed by the claims. The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An optical storage system that receives an optical medium having a plurality of tracks for storing data, the system comprising:
    an optical head having a first coherent light source modulated at higher power during writing of data to the optical medium and a second coherent light source operating in a continuous wave mode at lower power while the first coherent light source is writing data, optics that combine light from the first and second light sources and focus light from the first coherent light source to a first spot of a selected track on the optical medium and focus light from the second coherent light source to a second spot on the selected track downstream from the first spot relative to movement direction of the optical medium, the optics directing reflected light from the optical medium to a photodetector; and
    a controller coupled to the optical head that selectively positions the optical head for writing data along the selected track using the first coherent light source while reading data directly after writing from the selected track using reflected light from the second coherent light source detected by the photodetector and compares the data read to the data written to provide data verification of the data.

2. The system of claim 1 wherein the optics comprise:
    an amplitude beam splitter that transmits more than about 90% of incident light from the first coherent light source and redirects less than about 10% of light from the second coherent light source toward the optical medium.

3. The system of claim 2 wherein the optics further comprise a collimating lens positioned to receive light from the first and second coherent light sources passing through the amplitude beam splitter.

4. The system of claim 3 wherein the optics further comprise a polarizing beam splitter positioned to transmit light from the collimating lens toward the optical medium and to direct light reflected from the optical medium away from the collimating lens.

5. The system of claim 4 wherein the optics further comprise a device to modify polarization of incident light, the device positioned between the polarizing beam splitter and the optical medium.

6. The system of claim 5 wherein the device comprises a quarter-wave plate.

7. The system of claim 5 wherein the optics further comprise an objective lens disposed between the device to modify polarization and the optical medium.

8. The system of claim 7 wherein the optics further comprise a mirror positioned to redirect light reflected from the optical medium and redirected by the polarizing beam splitter toward the photodetector.

9. The system of claim 1 wherein the optical medium comprises an optical tape.

10. A method for providing direct read after write functionality for an optical storage device that reads and writes data to an optical storage medium, comprising:

combining light from a first laser modulated at higher power during writing of data to the optical storage medium and light from a second laser operated in a continuous wave mode at lower power;

focusing light from the first laser to a first spot within a selected track on the optical storage medium;

focusing light from the second laser to a second spot within the selected track on the optical storage medium downstream relative to the first spot in the direction of travel of the optical storage medium;

directing light reflected from the second spot to a photodetector to provide direct read after write functionality.

11. The method of claim 10 further comprising changing polarization of light directed to the optical storage medium relative to light reflected from the optical storage medium to facilitate redirection of the light reflected from the optical storage medium to the photodetector.

12. The method of claim 10 further comprising directing light from the first and second lasers that is not directed to the optical storage medium to an optical absorber.

* * * * *

UNITED STATES PATENT AND TRADEMARK OFFICE
CERTIFICATE OF CORRECTION

| | | |
|---|---|---|
| PATENT NO. | : 8,792,317 B2 | Page 1 of 1 |
| APPLICATION NO. | : 13/416633 | |
| DATED | : July 29, 2014 | |
| INVENTOR(S) | : Wilson | |

It is certified that error appears in the above-identified patent and that said Letters Patent is hereby corrected as shown below:

Title Page, column 1, under Inventor, line 1, delete "Thorton" and insert -- Thornton --, therefor.

Signed and Sealed this
Twenty-sixth Day of May, 2015

Michelle K. Lee
*Director of the United States Patent and Trademark Office*